United States Patent [19]

Mancuso et al.

[11] Patent Number: 5,074,597

[45] Date of Patent: Dec. 24, 1991

[54] COMPUTERIZED METHOD OF GENERATING FILM MASTERS FOR EMBOSSING AND PRINTING COLOR IMAGES

[75] Inventors: Robert J. Mancuso, Middleboro, Mass.; Mark Chandler, Bloomingdale, Ill.

[73] Assignee: The Lehigh Press, Inc., Pennsauken, N.J.

[21] Appl. No.: 573,841

[22] Filed: Aug. 28, 1990

Related U.S. Application Data

[63] Continuation-in-part of Ser. No. 304,900, Jan. 31, 1989, Pat. No. 4,932,685, which is a continuation of Ser. No. 2,783, Jan. 13, 1987, abandoned.

[51] Int. Cl.[5] .......... B42D 15/00; H04N 5/74

[52] U.S. Cl. .......... 283/91; 283/67; 283/87; 283/94; 358/234

[58] Field of Search .......... 283/67, 87, 74, 90, 283/91, 92, 93, 94; 364/225.5; 358/76, 77, 78, 183, 234, 98; 430/541, 935

[56] References Cited

U.S. PATENT DOCUMENTS

| | | | |
|---|---|---|---|
| 3,980,476 | 9/1976 | Wysocki | 358/234 X |
| 4,196,452 | 4/1980 | Warren et al. | 358/234 X |
| 4,501,439 | 2/1985 | Antes | 283/91 |
| 4,588,212 | 5/1986 | Castagnoli | 283/91 |
| 4,626,445 | 12/1986 | Dobrowolski et al. | 283/91 X |
| 4,727,418 | 2/1988 | Kato et al. | 358/183 X |

*Primary Examiner*—Joseph M. Gorski
*Assistant Examiner*—Peter D. Vo
*Attorney, Agent, or Firm*—Iandiorio & Dingman

[57] ABSTRACT

A computerized technique for generating masters for embossing and printing color images with local regions of variation of an optical characteristic such as reflectance is disclosed. The color image is read into a computer and displayed on the computer screen. An electronic embossing mask is created for each local region which is to have a preselected optical variation. The line pattern is designated for each local region mask and an embossing film is exposed with each electronic embossing mask for creating in the embossing film a composite image including each line pattern in each local region. A plurality of electronic color separation masks are generated from the original color image, and each of these is combined with an electronic embossing mask to form an electronic line color separation mask having line patterns which correspond to those designated for the local regions. A plurality of color separation films are then exposed with each electronic embossing mask separation image for creating on each color separation film a single color image with the designated line patterns in local regions.

14 Claims, 8 Drawing Sheets

98

COMPUTERIZED METHOD OF GENERATING FILM MASTERS FOR EMBOSSING AND PRINTING COLOR IMAGES

RELATED CASE

This application is a Continuation-in-Part of U.S. patent application Ser. No. 07/304,900, filed Jan. 31, 1989, now U.S. Pat. No. 4,932,685 entitled "Variable Color Print and Method of Making Same", by Robert J. Mancuso, which is a Continuation of U.S. patent application Ser. No. 002,783, of the same title, filed Jan. 13, 1987 now abandoned.

FIELD OF THE INVENTION

This invention relates to a computerized method of generating film masters for embossing and printing color images with local regions of preselected variations in optical characteristic variation.

BACKGROUND OF INVENTION

There is a technique for making color prints in which different local regions of the image have variations in reflectance or some optical characteristics so that the image varies as a function of viewing position. The procedure involves a combination of mechanical and photographic operations which are slow and tedious. A set of negatives must first be made to isolate each different local region, that is, to have a reflectance variation. Positives are made from the negatives and combined with them to form photographic masks which are used to expose an embossing film master through a grid of lines. Each local region which is to have a reflectance variation is exposed through grid lines inclined at a preselected angle. When completed, the film embossing master contains a set of parallel lines in each local region which have a reflectance variation. Within each region, the lines are parallel to each other. The angle of the lines changes from region to region but many regions may use the same line angle. This embossing film master is used to make a debossing plate that embosses a foil according to the regional line patterns Then color separations have to be made from the color image, e.g. cyan, magenta, yellow and black. Each of these is used to created a color separation film master by exposing a film through the local region line patterns established on the embossing film master. Thus each color separation film master has a color distribution identical with that of the original color image but lined in accordance with the line patterns designated for each particular local region. These color separation film masters are used to create printing plates for printing the final color image on the embossed foil with the embossed lines and the color lines in registration to produce an image whose various regions distinguish themselves by the varied manner in which they reflect light as the viewer shifts his viewing angle or that of the incident light. This is the technique taught in U.S. patent application Ser. No. 07/304,900, filed Jan. 31, 1989, entitled "Variable Color Print and Method of Making Same", by Robert J. Mancuso, which is a Continuation of U.S. patent application Ser. No. 002,783, filed Jan. 13, 1987, of the same title, and incorporated herein by reference. Although the explanation so far illustrates the technique only with respect to varying the reflectance, this is not a limitation as the film masters may be used to vary other optical characteristics to get a similar result in the final color print.

SUMMARY OF INVENTION

It is therefore an object of this invention to provide an improved automated method of generating film masters for embossing and printing color images.

It is a further object of this invention to provide such a method which is computerized.

It is a further object of this invention to provide such a method which is faster, simpler and easier.

It is a further object of this invention to provide such a method which creates the film masters directly from the original color image electronically without the need for intermediate positive and negative films.

This invention results from the realization that the necessary embossing film master and color separation film masters to make a variable effect color print can be made directly electronically from the original color image by using a computer to delineate local regions in which reflectance variation is desired, establishing lines at specific angles in each such region, and printing out the embossing film master, and by using the computer to create color separation film masters for the image having the same line pattern in each local region as the embossing film master.

This invention features a computerized method and apparatus for generating film masters for embossing and printing color images with local regions of preselected optical variations. The color image is read into a computer and displayed on the computer screen. An electronic embossing mask is created for each local region which is to have a preselected optical variation, and a line pattern is designated for each local region. An embossing film is then exposed from each electronic mask for creating on the embossing film a composite image including each line pattern in each local region. A plurality of electronic color separation masks are generated from the color image. Each of the electronic embossing masks is combined with each of the electronic color separation masks to form an electronic color separation mask having line patterns corresponding to those designated for local regions. A plurality of color separation films is then exposed to each lined color separation mask for creating on each color separation film the single color image for the designated line patterns and local regions.

In preferred embodiments, the optical characteristic which is varied may be reflectance. Although for simplicity the local image regions have been shown as the obvious geometric figures of a circle, triangle, and square, this is not a necessary limitation of the invention. In a preferred embodiment, the designation of the line pattern may include identifying tone levels, outlining objects or identifying color values to create the local image regions. The line patterns may include lines inclined at angles from zero to 360°. The exposing of the embossing film can be done serially, one mask after the other, or using all the masks at once. Similarly, the exposing of the color separation films can be done serially or with all of the masks at the same time.

DISCLOSURE OF PREFERRED EMBODIMENT

Other objects, features and advantages will occur to those skilled in the art from the following description of a preferred embodiment and the accompanying drawings, in which.

Figure 5:
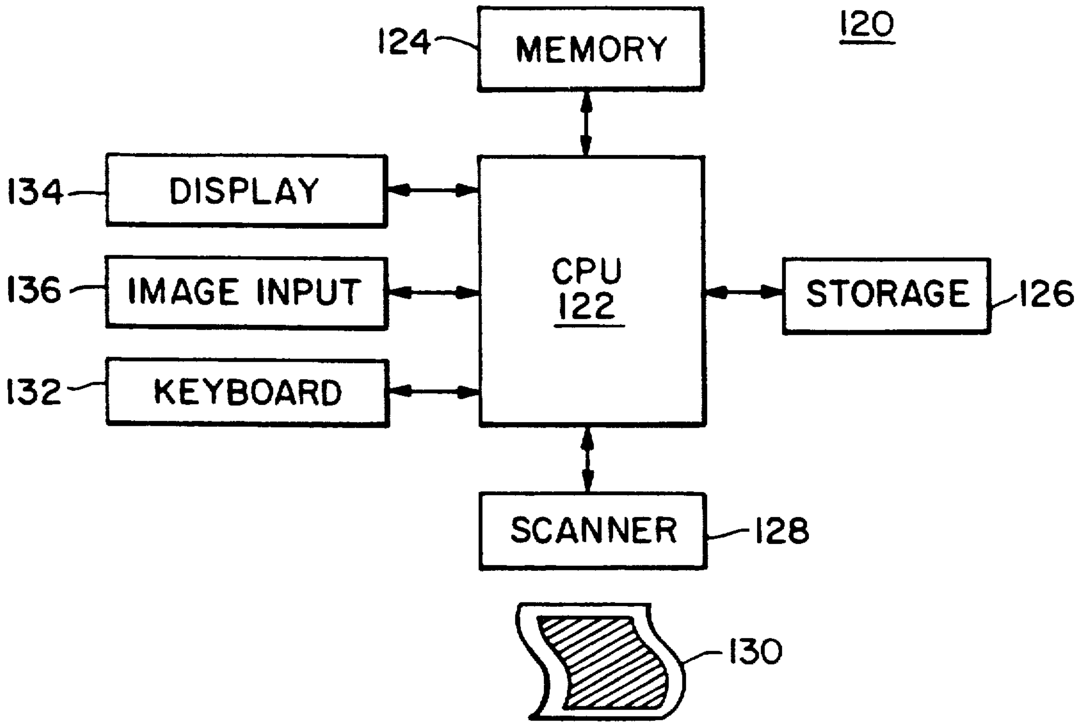
FIG. 5 is a schematic block diagram of a computer system which can be used according to this invention.
Figure 7:
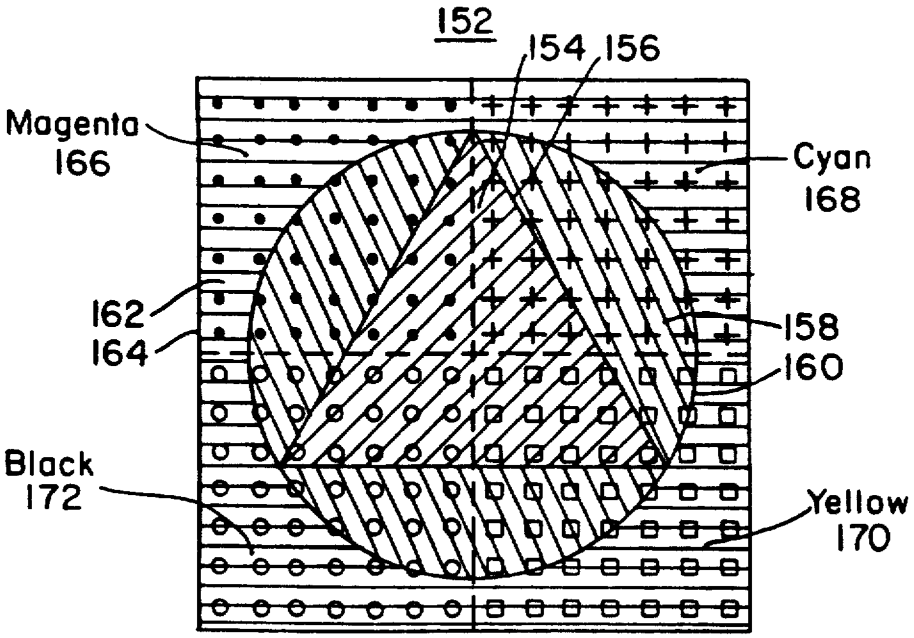
Figure 6A:
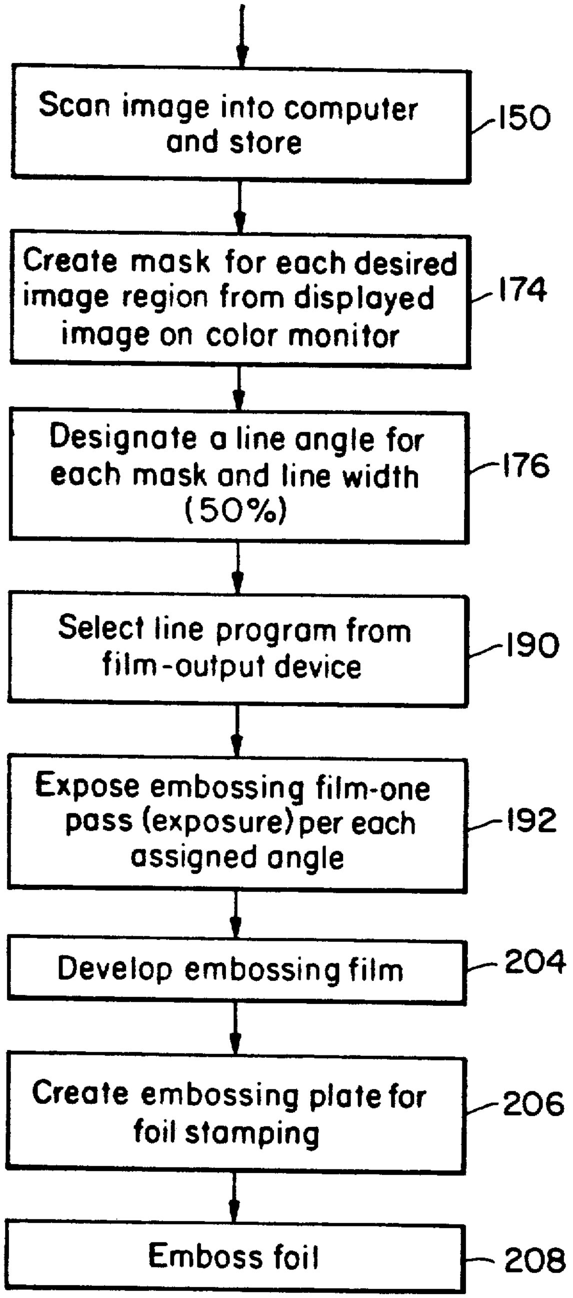
Figure 8:
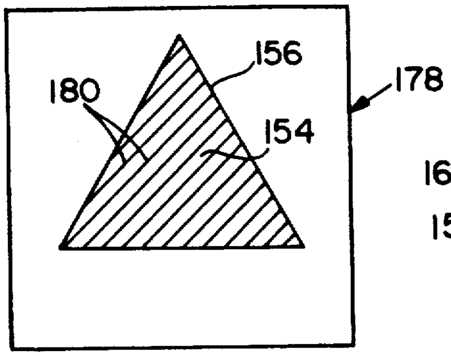
Figure 9:
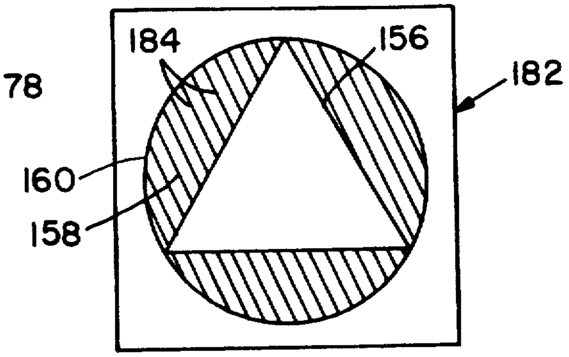
Figure 10:
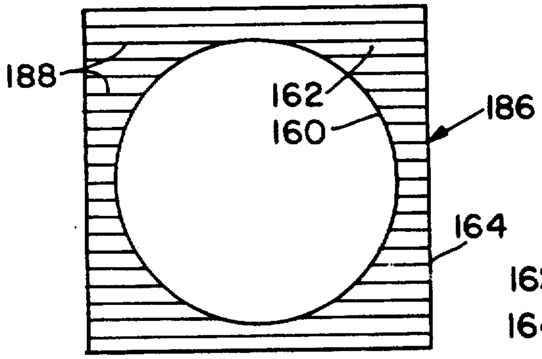
Figure 11:
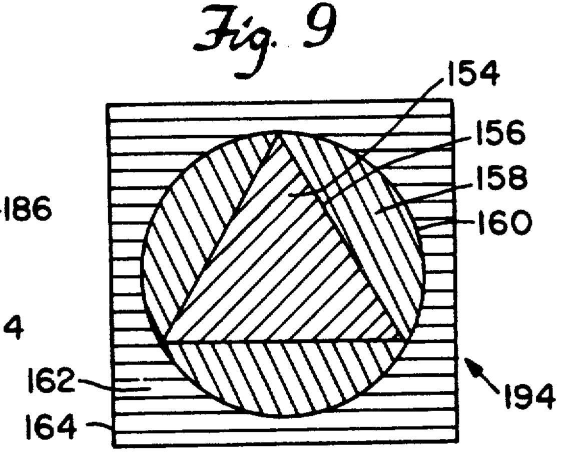
Figure 13:
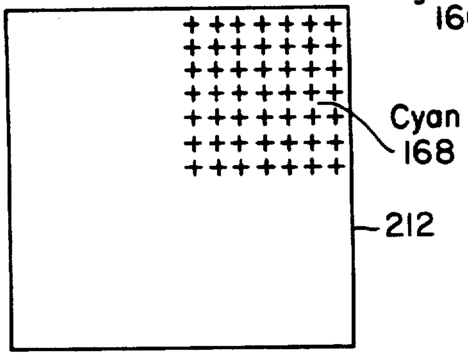
Figure 14:
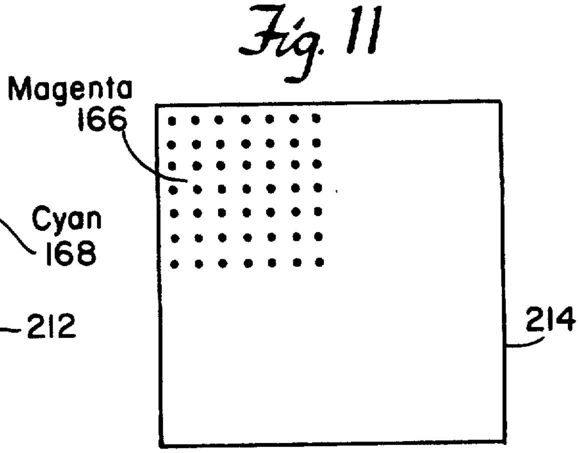
Figure 15:
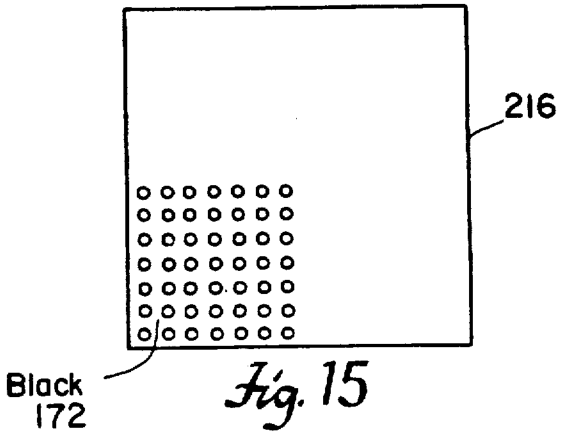
Figure 16:
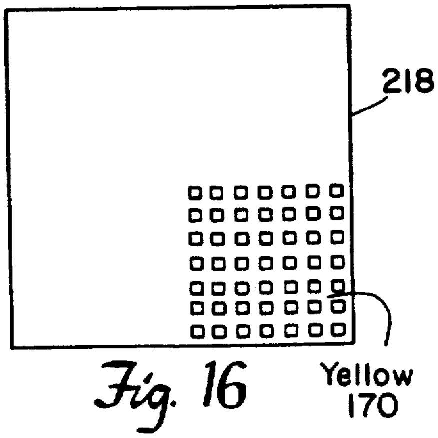
Figure 12:
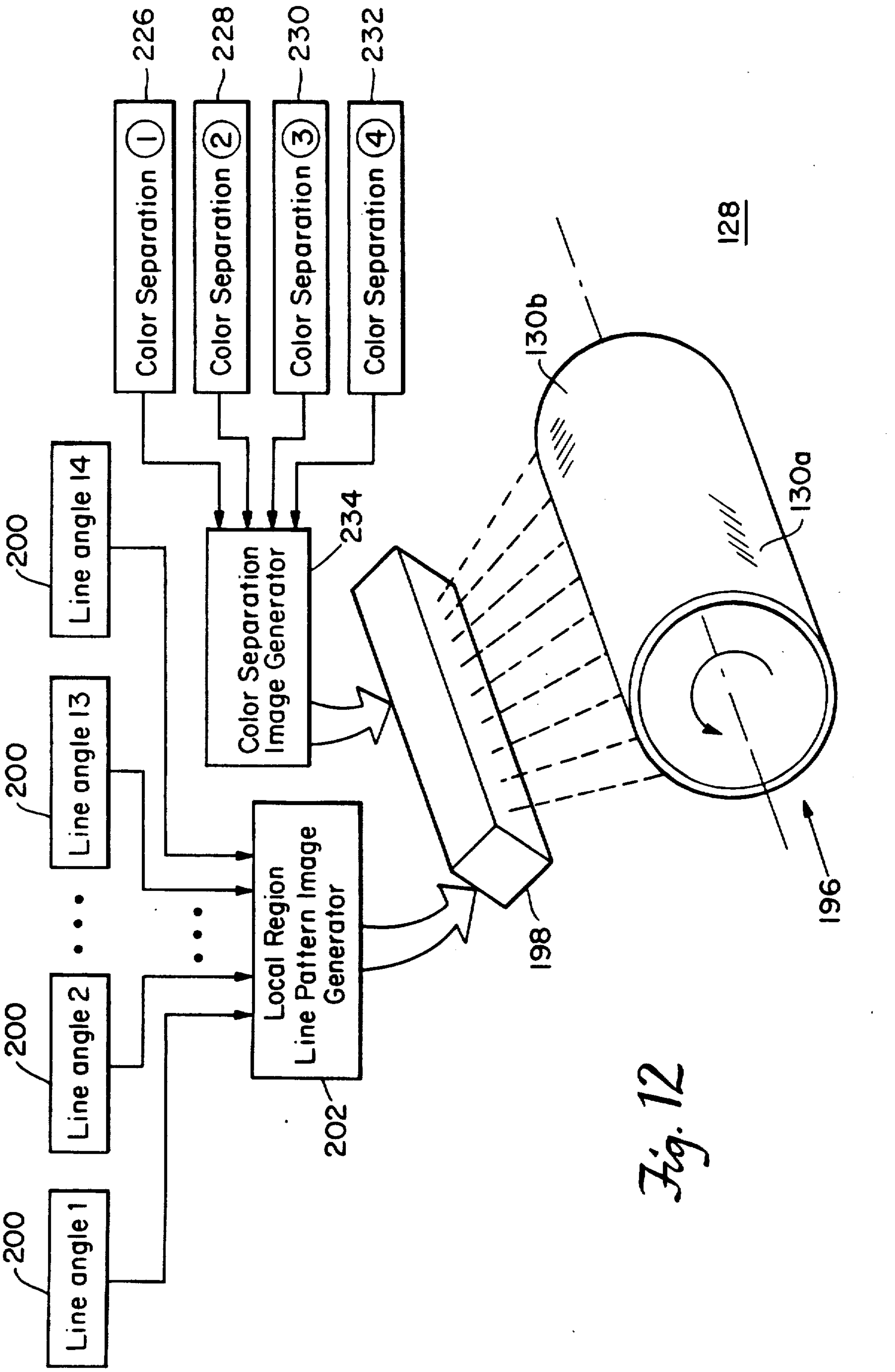
Figure 17:
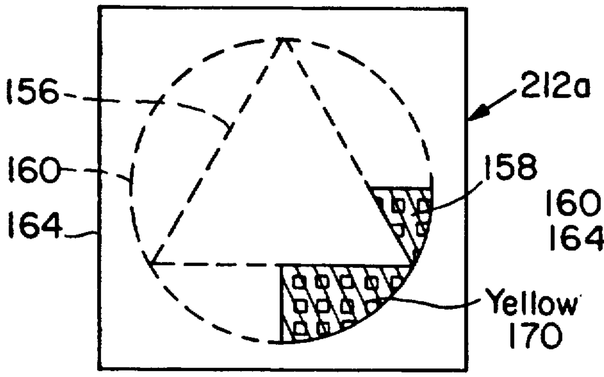
Figure 18:
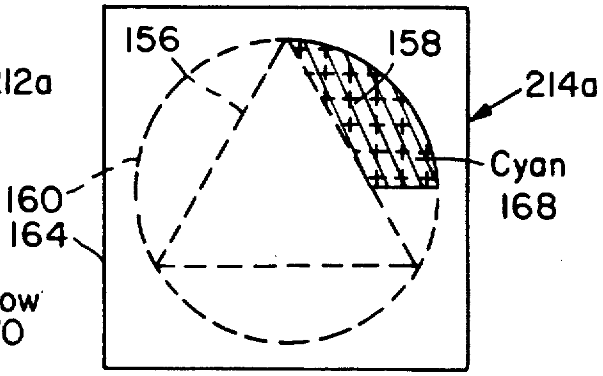
Figure 19:
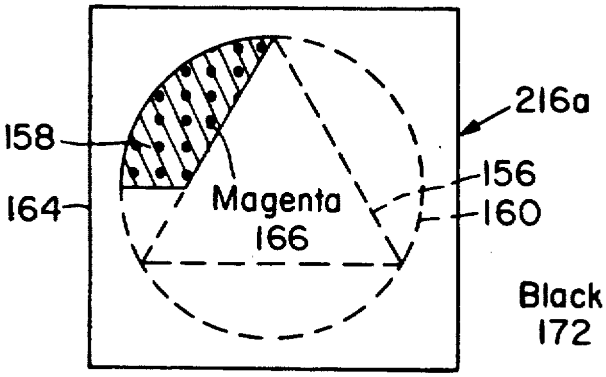
Figure 20:
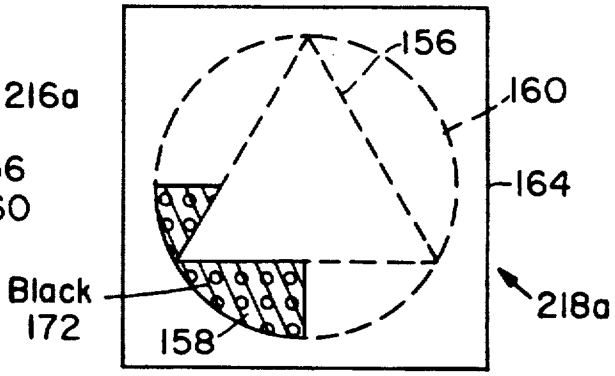

FIGS. 6A and B are flow charts illustrating the computerized electronic technique for making film masters according to this invention;

FIG. 7 is a diagram of a simplified variable color image for which film masters for color printing are to be made according to this invention;

FIGS. 8, 9 and 10 depict an electronic local image region embossing masks for making an embossing film master according to this invention;

FIG. 11 illustrates the composite mask or embossing film master resulting from the individual masks of FIGS. 8, 9 and 10;

FIG. 12 is a more detailed view of the scanner component of the scanner of FIG. 5;

FIGS. 13, 14, 15 and 16 illustrate electronic color separation masks; and

FIGS. 17, 18, 19 and 20 illustrate electronic color separation masks for local image region lines of one inclination.

The system and method of this invention involves a technique for electronically creating a first film master for making variations in an optical characteristic of a printing medium in local regions of a color image. A second set of film masters, color separation film masters, are made from the original color image. The color on the color separation film masters is arranged to align with the variations in optical characteristics carried by the first film master and the resulting printing medium.

The optical characteristic may be reflectivity and the variations may be achieved by embossing grooves on a printing medium such as foil using the first film master: the embossing film master. An embossing plate is then made with which a foil is embossed. The color separation film masters are then made with their color distribution aligned with the grooves in each local region. Color separation plates are made from the color separation film masters and they are used to print the color on the embossed foil so that the color aligns with the embossing in each local region. In this patent application the desired optical characteristic to be varied has been illustrated as reflective. But it should be understood that the film masters made according to this invention could be used to create whatever optical characteristic is desired.

Figures 1, 2:
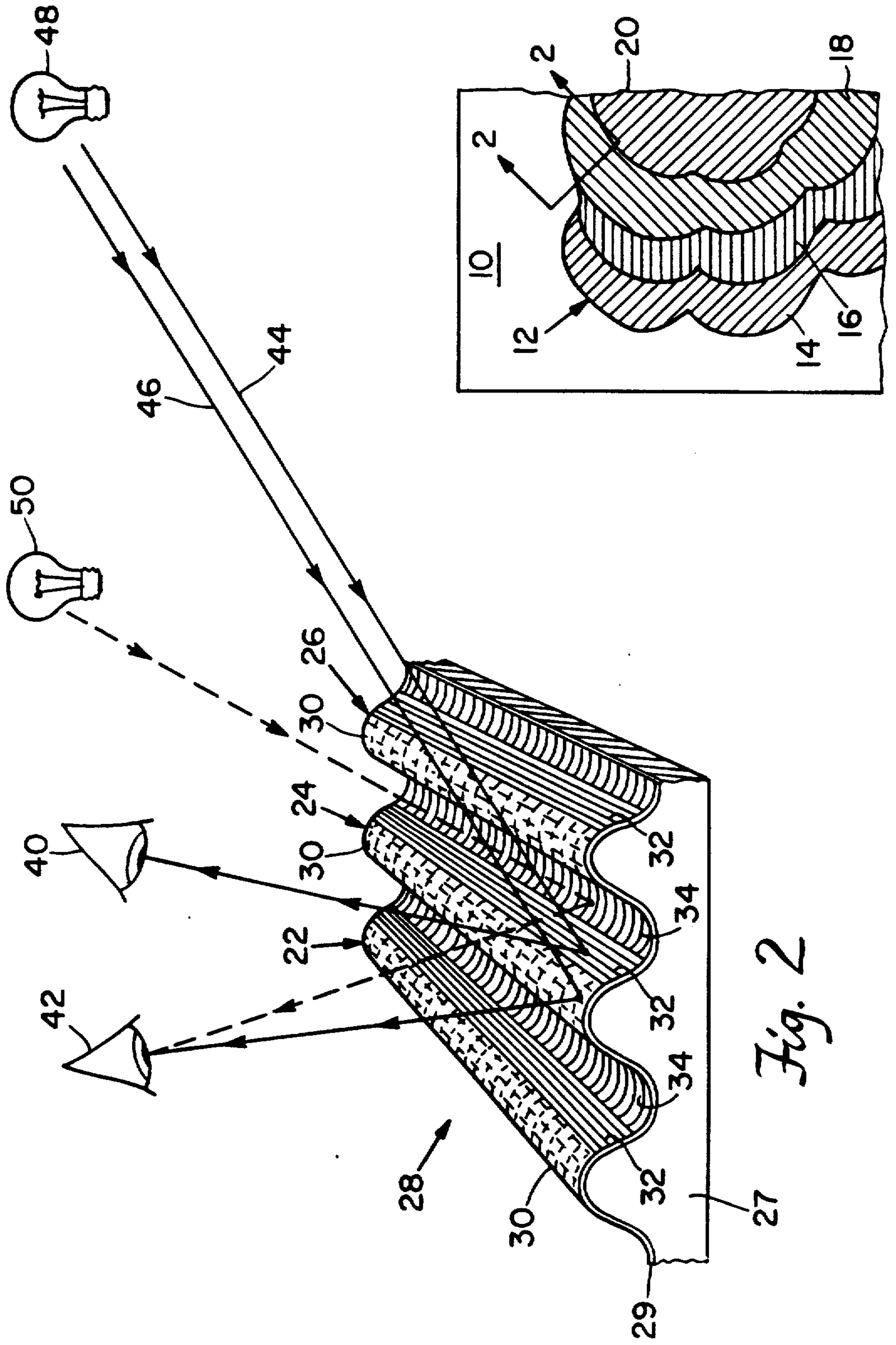
FIG. 1 is an enlarged schematic view of a portion of the variable color print made with the film masters according to this invention showing a cloud having several different local image regions.
FIG. 2 is a greatly enlarged diagram taken along lines 2—2 of FIG. 1 showing the embossed grooves and aligned colors which create the effect shown in FIG. 1.

There is shown in FIG. 1 a portion of a variable color print 10 made according to this invention. The portion of print 10 shown includes a cloud 12 which has been divided into four different local image regions 14, 16, 18 and 20 in accordance with this invention. Each of the local image regions represents a different gradation of white or of a rosy hue imbued by a sunset to cloud 12. Each of the local image regions has optical characteristics such as variable reflectance constructed right into print 10, as indicated by the lines in each local image region which are oriented at different angles. The lines in FIG. 1 actually represent periodic grooves such as grooves 22, 24, 26, shown greatly enlarged in FIG. 2. Grooves 22, 24 and 26 are established in substrate 27 such as by heat transfer and debossing of foil 29 on substrate 27. Colors 28 are then printed onto foil 29 in general alignment with the grooves 22, 24, 26. Because of the grooves in reflective foil 29, a variable color effect is created in which the reflectivity changes as the viewing angle changes. In this particular construction, the colors 28 include yellow stripes 30, magenta stripes 32, and cyan stripes 34. Other colors, including gray, black and white, can be substituted for or provided in addition to these colors.

The effect of changing the viewing angle is shown by the position of observers 40, 42 in relation to light rays 44, 46 from light source 48. Groove 24 affects primarily magenta light from strip 32 as illuminated by light ray 44 and perceived by observer 40. The yellow color from stripes 30 as illuminated by light ray 46 is reflected at a different angle which is not perceived by viewer 40. However, the viewing angle shifts so that when observer 40 moves to the point occupied by observer 42, the yellow color is perceived instead of the magenta color. A different viewing angle can also be achieved for example by shifting the light source. When the light source occupies the position shown at 50, the observer 42 perceives cyan most strongly of all the colors.

Viewing a color includes perceiving the color in an image region even if other colors are also visible. A change in the viewing angle such as a change in the angle of illumination or observation results in a change in the colors perceived as generated by grooves 22, 24, 26. Referring to FIG. 1, at one viewing angle regions 14 and 20 appear primarily yellow, region 16 appears primarily cyan, and region 18 appears primarily magenta. Depending on the width of the printed color stripes, a greater or lesser amount of silver foil may also be visible. The grooves are usually made using an embossing film master whose local image region lines are approximately 50%, that is the lines and the spaces between them are roughly equal so that the peaks and valleys of the grooves are roughly equal in size. This is not typically so with the color stripes. In that case the color separation master films may have their respective color lines made at 50%, but may also have them made at 1% or 2%, or up to 100%. The wider the lines, the deeper the color that is achieved in the final print, and the thinner the lines, the lighter the color.

The lines are generally spaced at 100–400 lines per inch to provide a visually pleasing image. It is desirable to provide lines spaced at least 65 lines per inch. Providing fewer than approximately 65–100 lines per inch is acceptable but results in the perception of individual grooves or stripes of color rather than a general region of color. Lines at fourteen different angles have been used: 0°, 7.5°, 20°, 30°, 45°, 52.5°, 60°, 80°, 105°, 112.5°, 140°, 165°, 172.5°, and 180°. Generally, each local image region has lines of a different angle, but of course when there are more local image regions than there are possible line angles, the line angles are repeated. In that case the same angles may be used in more than one region, but at least there should be different angles used in neighboring or adjacent regions.

Figure 3:
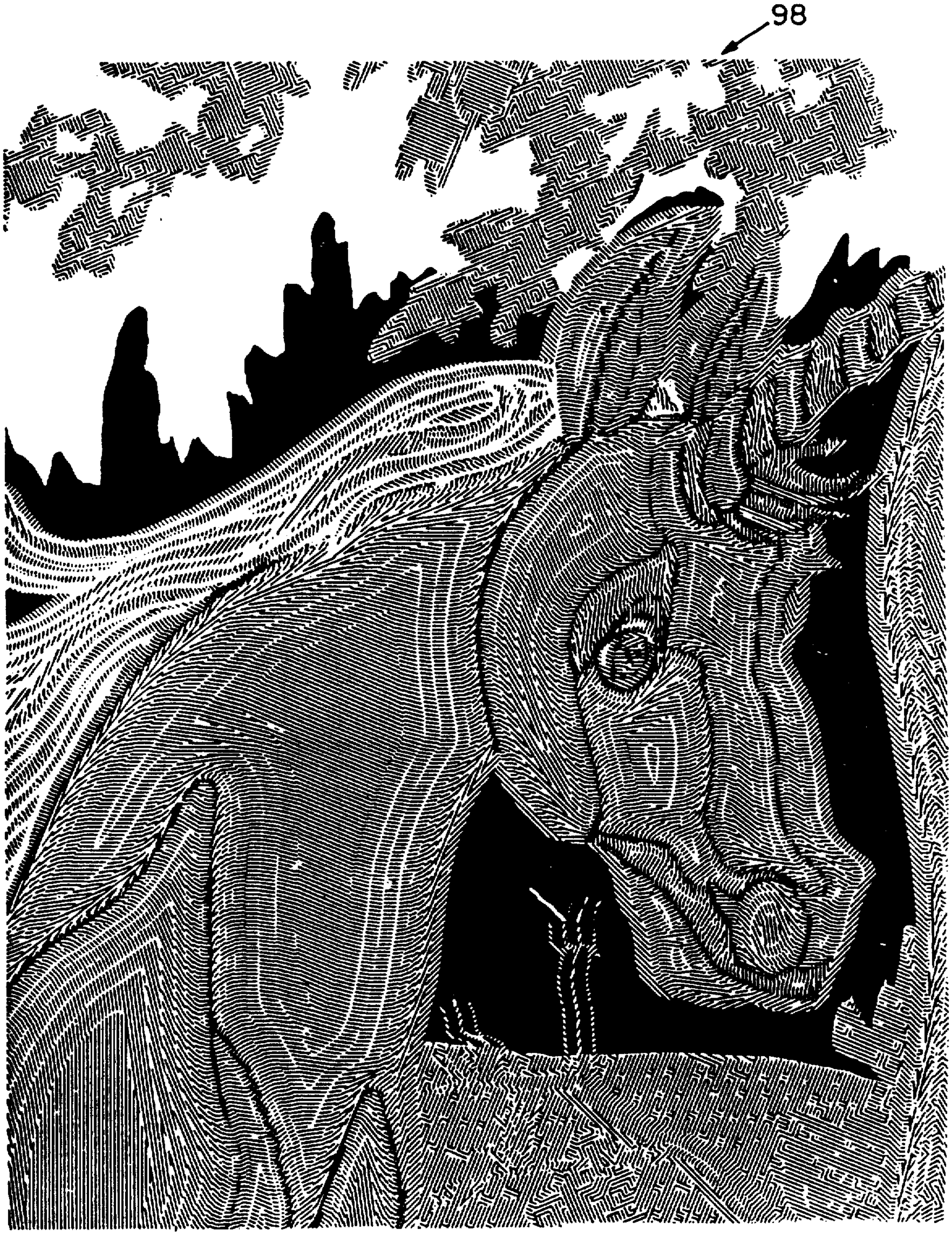
FIG. 3 is an enlarged view of a more complex pattern of local image regions according to this invention.
Figure 4:
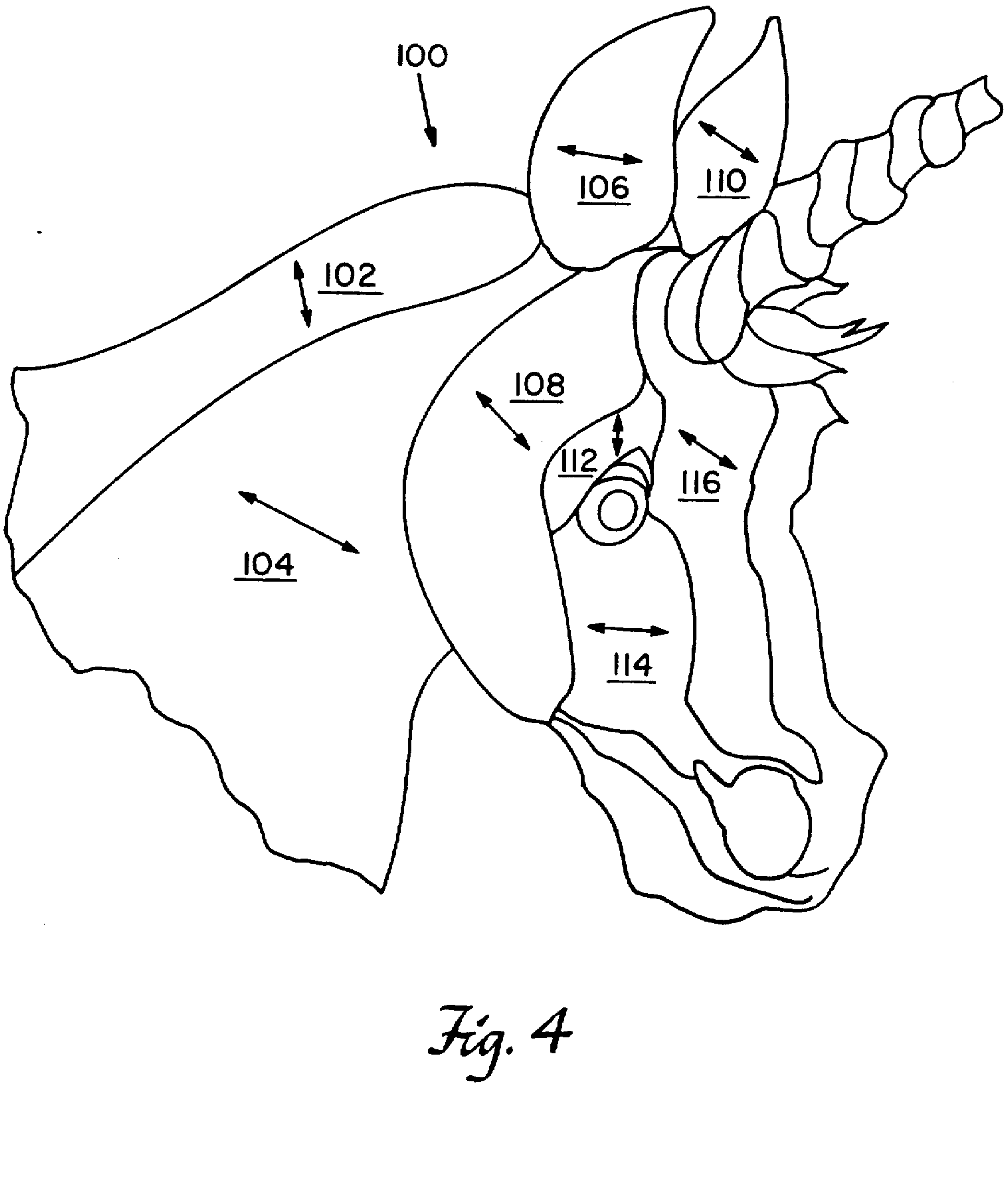
FIG. 4 is an outline of the image in FIG. 3 showing more clearly the local image regions.

An embossed foil 98 bearing a more complex image is shown in FIG. 3. A schematic of that image is shown in FIG. 4, where it can be seen that unicorn 100 contains local image regions such as regions 102, 104, 106, 108, 110, 112, 114 and 116. The line pattern within each local image region seen in FIG. 3 is generally oriented in a different direction as indicated by the respective arrows in these regions in FIG. 4. The patterns of the local image regions 102, 104, . . . 116 are selected to enhance details of the image and provide a more intriguing effect through varied light and color effects.

The print products and effects described in FIGS. 1–4 can be accomplished using a computerized system 120, FIG. 5 including a CPU 122, memory 124, storage 126, and scanner 128, which exposes the final embossing film master 130 and color separation film masters 131. The keyboard 132 allows the operator to completely control the manipulation of the various images viewable on display 134. An image input device 136 such as a color digitizing board is provided to read into the system the entire color image to be printed. One such system is the Chromacom with the Screen System 26, available from Hell Graphics Systems, Inc.

The operation of system 120 is shown with respect to the flow charts in FIGS. 6A and B. Initially, in step 150, FIG. 6A, the operator scans the image into the computer using image input device 136. For simplicity in this example, the image 152, FIG. 7, includes three different local image regions. Local image region 154 is defined by triangle 156. Local image region 158 is the area between triangle 156 and circle 160, and local region 162 is the area between circle 160 and the square outer frame 164 of image 152. The coloration of image 152 is shown in very simplified form also. There are four colors in image 152, one color in each of the four quarters of the image: magenta, 166, in the upper left corner; cyan, 168, in the upper right corner; yellow, 170, in the lower right corner; and black, 172, in the lower left corner. Normally these colors do not appear in distinct and separate areas of print; they occur throughout the print separately and mixed together in various degrees to give other colors such as browns and oranges and the like. Also, normally color prints do not have such nicely defined local image regions, but these approaches have been taken in order to simplify the understanding of the technique.

After image 152 is scanned into the computer, an electronic mask is created in step 174, FIG. 6, for each local image region of the image which is displayed on display 134 that is to have a reflectance variation or variation in some other optical characteristic. This is the first step in creating an embossing film master. After each local image region is defined in step 174, the line pattern is chosen and assigned in step 176 for each of those local image regions. For example, the electronic mask 178, FIG. 8, which is created for local image region 154, reproduces the triangle 156 and assigns lines 180 at an angle of 45°. The electronic mask 182, FIG. 9, for local image region 158 between triangle 156 and circle 160, is assigned lines 184 at an angle of 110°. Electronic mask 186, FIG. 10, defines local image region 162 between circle 160 and the outer edge of square 164. The lines 188 are at an angle of 180°. In step 176 the line widths are selected. Typically, in this routine which creates the embossing film master, the line width chosen is approximately 50%. The line program is selected from the film output device in step 190. The embossing film is then exposed in step 192 to create the embossing film master 194, FIG. 11. Step 192 may be carried out through scanner 128, FIG. 5, as shown in more detail in FIG. 12, where a scanner is shown including drum 196 which contains on it a piece of film **130*a* to made into the embossing film master. This can be done by printing the line patterns from all three local regions 154, 158 and 162 simultaneously or one at a time. For example, each time film 130*a* on rotating drum 196 passes under exposing head 198, one of the line angle inputs 200 enables the local region line pattern image generator 202 to drive exposing head 198 to expose all the lines at that particular angle, no matter in which local image region they may reside. In step 204, the embossing film master is developed, and then an embossing plate is created in step 206 which can be used to emboss the foil in step 208**.

Figure 6B:
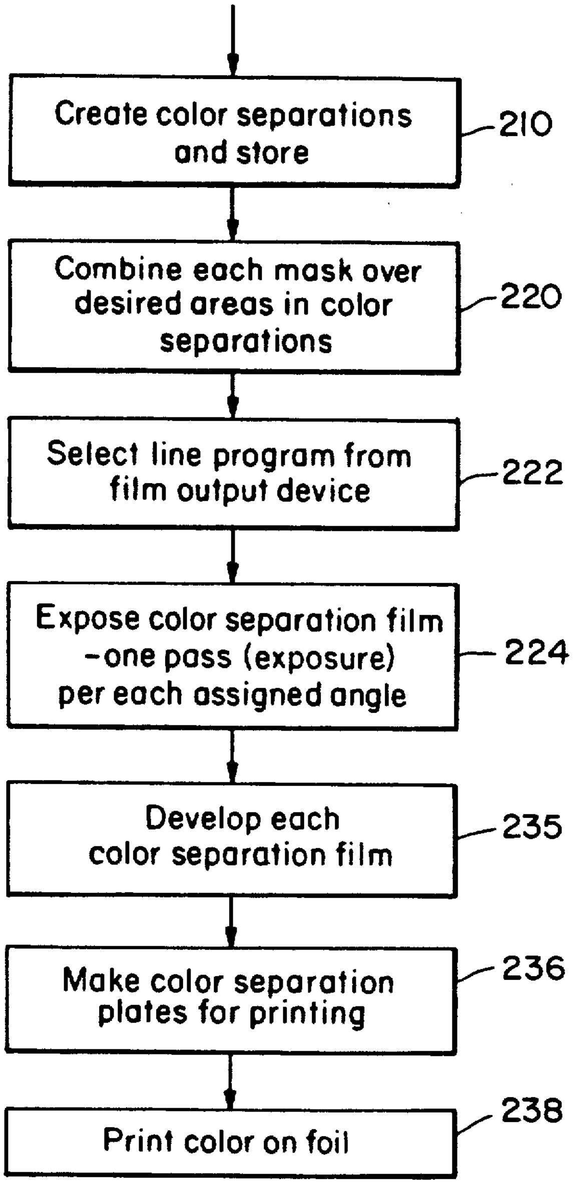

The color separation film master is executed by creating color separations for each color in the image and storing them in step 210, FIG. 6B. The result is electronic color separation mask 212 for cyan, FIG. 13; electronic color separation mask 214 for magenta, FIG. 14; electronic color separation mask 216 for black, FIG. 15; and electronic color separation mask 218 for yellow FIG. 16.

Following this, each of the electronic color separation masks 212, 214, 216 and 218 are combined in step 220 with electronic embossing film master masks 178, 182, 186 to form the electronic color separation mask with the line pattern included. These final electronic masks **212*a*, 214*a*, 216*a*, 218*a* are shown in FIGS. 17–20. In step 222 the line program is selected from the film output device. The masks are used to expose in step 224 each color separation film with each electronic line pattern mask associated with the corresponding color separation. Subsequently the next line pattern, such as the one in local image region 154, is exposed and then the third line pattern in local image 162, in order to complete the color separation image masks 212*a*, 214*a*, 216*a* and 218*a***.

The end result, appears as in FIG. 7, and can be accomplished once again using the scanner 128 of FIG. 12. Now, however, the film master **130*b* actually contains four sections or frames of film on drum 196, and the input from the four different electronic color separation masks 226, 228, 230 and 232 are used to create the color separation in color separation image generator 234, which drives exposure head 198. The lines of color, which may have a width anywhere from something larger than zero all the way up to 100%, are created on the color separation master film 130*b* over the same angles as the lines which were assigned to the local image regions. After this, each of the color separation film masters is developed in step 235, and they are used in step 236 to create color separation plates for printing, which are then used in step 238** to print the color on the foil with the color lines aligned with the foil embossings in each of the local image regions.

Although the explanation of the specific embodiment featured herein illustrates a system in which each mask and color separation is a separate object and the exposure of each mask and separation is done seriatim, one at a time, this is not a necessary limitation of the invention as they may be composite forms in the computer and/or a plurality or all masks or separations may be exposed simultaneously.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A computerized method of generating film masters for embossing and printing color images with local regions of preselected variations in an optical characteristic, comprising:

reading a color image into a computer;

displaying the color image on a computer screen;

creating an electronic mask for each local region which is to have a preselected optical variation;

designating a line pattern for each of said masks created;

exposing an embossing film with each electronic embossing mark thereby creating, on the embossing film, a composite image including each line pattern in each of said local regions;

generating a plurality of electronic color separation masks from the color image;

combining each electronic embossing mask with each electronic color separation mask thereby forming an electronic lines color separation mask having line patterns corresponding to said line patterns designated for said local regions; and exposing a plurality of color separation films with each electronic lined color separation mask thereby creating, on each color separation film, a single color image with the line patterns designated in said local regions.

2. The method of claim 1 in which designating a line pattern includes identifying tonal levels.

3. The method of claim 1 in which designating a line pattern includes outlining objects.

4. The method of claim 1 in which designating a line pattern includes identifying color values.

5. The method of claim 1 in which the line pattern includes lines inclined at an angle from zero to 180°.

6. The method of claim 1 in which the optical characteristic is reflectance.

7. The method of claim 1 in which the embossing film is exposed sequentially with each embossing mask.

8. A computerized system for generating film masters for embossing and printing color images with local regions of variation of an optical characteristic, comprising:

means for reading a color image into a computer;

means for displaying the color image;

means for creating an electronic embossing mask for each local region which is to have a preselected optical variation;

means for designating a line pattern for each of said masks created;

means for exposing an embossing film with each electronic mask thereby creating, on the embossing film, a composite image including each line pattern in each of said local regions;

means for generating a plurality of electronic color separation masks from the color image;

means for combining each electronic embossing mask with each electronic color separation mask thereby forming an electronic line color separation mask having line patterns corresponding to said line patterns designated for said local regions; and means for exposing a plurality of color separation films with each electronic lined color separation mask thereby creating, on each color separation film, a single color image with the line patterns designated in said local regions.

9. The system of claim 8 in which said means for designating a line pattern includes means for identifying tonal levels.

10. The system of claim 8 in which said means for designating a line pattern includes means for outlining objects.

11. The system of claim 8 in which said means for designating a line pattern includes means for identifying color values.

12. The system of claim 8 in which said means for the line pattern includes lines inclined at an angle from zero to 180°.

13. The system of claim 8 in which said optical characteristic is reflectance.

14. The system of claim 8 in which the embossing film is exposed sequentially with each embossing mask.

* * * * *